Sept. 14, 1965   H. J. LARSON   3,205,857
CATTLE STANDING HEAT DETECTING DEVICE
Filed April 1, 1964   2 Sheets-Sheet 1
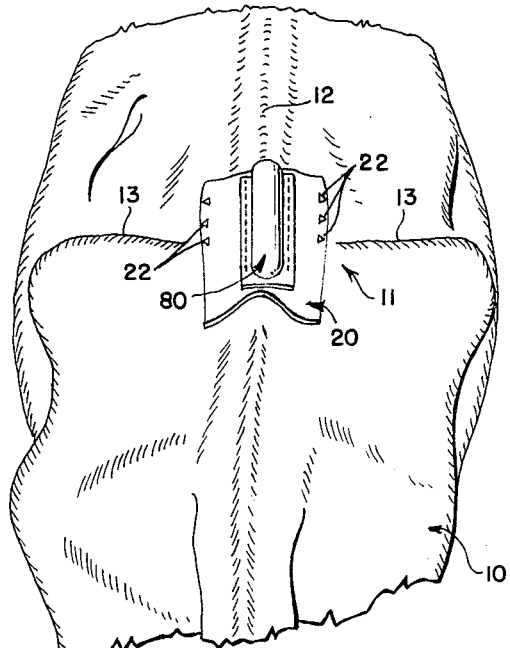
FIG. 1
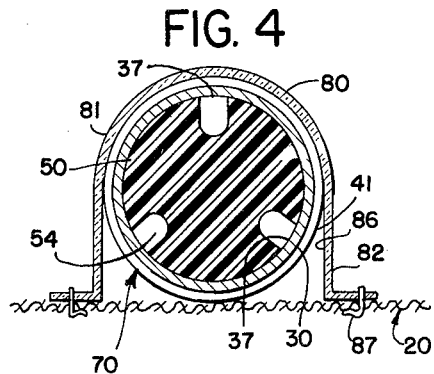
FIG. 4
FIG. 5
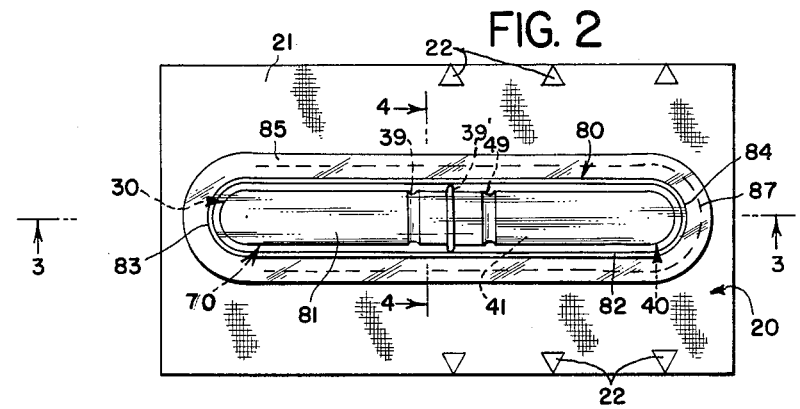
FIG. 2
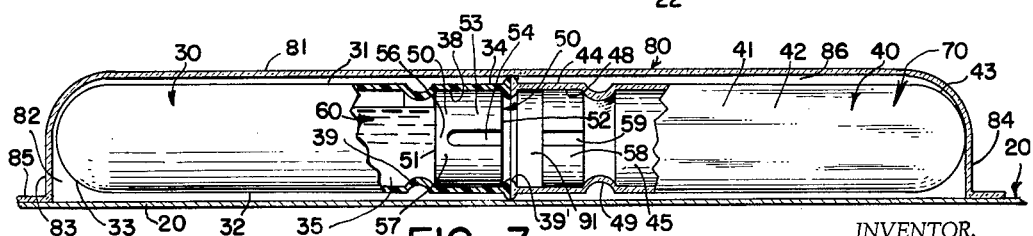
FIG. 3
INVENTOR.
HERBERT J. LARSON
BY
Caswell Lagaard & Wicks
ATTORNEYS Sept. 14, 1965        H. J. LARSON        3,205,857
CATTLE STANDING HEAT DETECTING DEVICE
Filed April 1, 1964        2 Sheets-Sheet 2
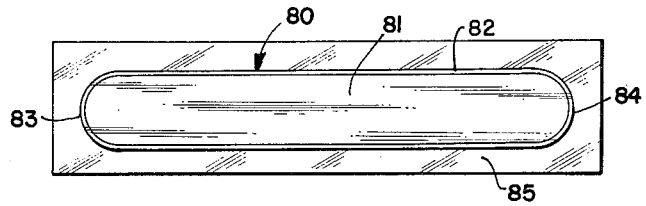
FIG. 7
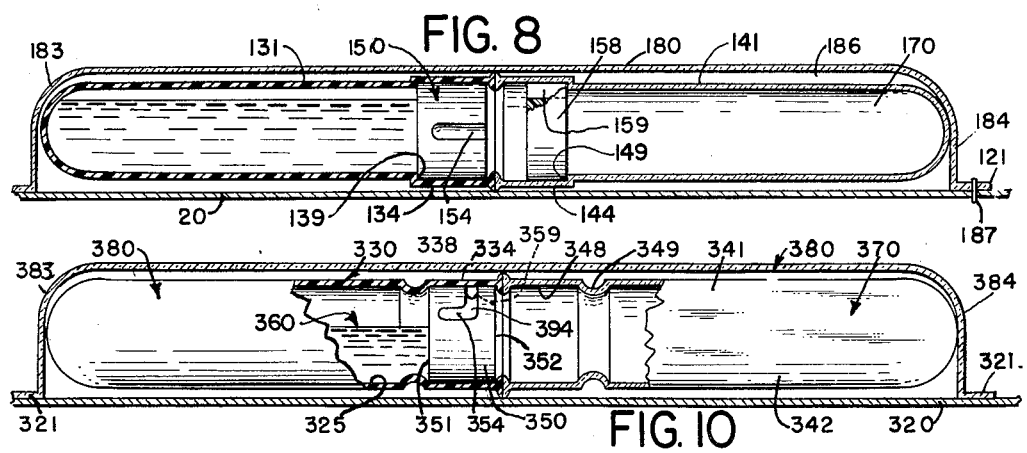
FIG. 8
FIG. 10
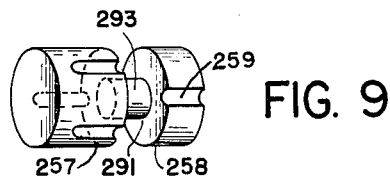
FIG. 9
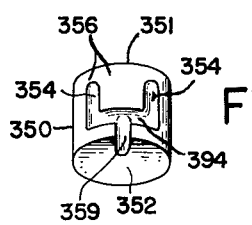
FIG. 11
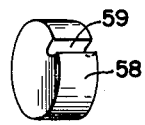
FIG. 6
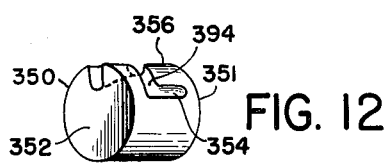
FIG. 12
INVENTOR.
HERBERT J. LARSON
BY
*Caswell Lagaard & Wicks*
ATTORNEYS

United States Patent Office 3,205,857
Patented Sept. 14, 1965

3,205,857
CATTLE STANDING HEAT DETECTING
DEVICE
Herbert J. Larson, 124 S. Vine St., Fergus Falls, Minn.
Filed Apr. 1, 1964, Ser. No. 356,475
6 Claims. (Cl. 119—1)

The herein disclosed invention relates to a detecting device by means of which cattle running at large in big herds in pastures can be identified when in heat and easily removed from the herd for breeding as by artificial insemination. Cows are classified as in standing heat when the cow submits to being mounted by another cow, this condition occurring in the early stage of a heat period. Dairy cattle, which are closely confined and controlled, are largely bred by artificial insemination. Cattle running at large in pastures, such as beef cattle, are not bred artificially because of the almost impossibility of removing a particular cow out of a herd without some identifying mark on the cow. Cows nearly all look the same and it is impossible to keep a man's eye on one cow, and know she is the right cow once she has milled with the herd.

Another object of the invention resides in providing a detecting device by means of which the percentage of conception in cows in heat and bred by artificial insemination may be greatly increased.

An object of the invention resides in providing the detecting device with a detector which can be used repeatedly.

Another object of the invention resides in providing the detecting device with a base adapted to be secured to the back of the cow to be tested and on which the detector may be detachably mounted and which is adapted to indicate that the cow has been mounted by another cow.

A still further object of the invention resides in providing a flexible sheet-like base adapted to be cemented to the back of the cow and which remains in position until the cow has conceived, and to or from which the detector may be attached or removed while it is mounted on the cow to permit of repeated artificial insemination in the event that the first insemination does not take.

An object of the invention resides in providing a detector which will not operate when a small amount of pressure is applied to the detector as occurs when the cow being tested passes through a fence and the board of the fence strikes the detector or when passing under a tree and a branch strikes the detector or when another cow tries to mount the cow in heat and the cow tested moves forward and the jaw of the mounting cow strikes the detector.

An object of the invention resides in providing a detector which when once actuated may be reset for repeated use to show whether the cow repeats heat or is bred.

A still further object of the invention resides in constructing the detector with a flexible container containing a colored liquid and positioned on the back of the cow in heat in a position for engagement with the mounting cow.

An object of the invention resides in providing a transparent receptacle communicating with the container, disposed ahead of the same and adapted to receive the discharge from the container when pressure is applied to the same.

Another object of the invention resides in providing partitioning means between the container and receptacle together with valve means controlling the flow of liquid between said container and receptacle.

A still further object of the invention resides in utilizing a portion of the partitioning means as a valve seat and utilizing a portion of the container as a valve member cooperating with said valve seat and controlling the flow of liquid between said container and receptacle.

Another object of the invention resides in disposing the valve seat at one end of the partitioning means and in providing a passageway or passageways extending through the other end and terminating in proximity to said valve seat.

A still further object of the invention resides in constructing said passageways as grooves extending longitudinally of the partition and projecting through the end and the outer surface of the same remote from the liquid in the container.

An object of the invention resides in providing a detector in which the liquid discharged into the receptacle may be returned to the container by alternately squeezing and releasing the container when the device is held in a substantially vertical position with the receptacle uppermost.

Frequently, when the cow being tested is mounted, her back arches and the detector is disposed in inclined position with the receptacle uppermost. It is an object of the invention to provide a construction operable under such conditions in which at least a substantial portion of the liquid is prevented from flowing back into the container and is retained in the receptacle when the cow dismounts.

Another object of the invention resides in providing means for discharging liquid received from the container into the upper portion of the receptacle when the detector is lying substantially horizontal.

An object of the invention resides in constructing the partition in the detector in two sections one facing the container and the other facing the receptacle and referred to as the container section and the other referred to as the receptacle section, said sections being spaced one from another to provide a compartment therebetween for the reception of the liquid discharge from the container upon pressure being accidentally applied to the container.

Another object of the invention resides in providing the section facing the receptacle with a passageway extending through the upper portion of the same for freely conducting the liquid from said compartment and into the receptacle.

A still further object of the invention resides in providing a connector for connecting said sections together.

Other objects of the invention reside in the novel combination and arrangement of parts and in the details of construction hereinafter illustrated and/or described.

In the drawings:

FIG. 1 is a perspective view of a portion of a cow illustrating the application of the invention thereto.

FIG. 2 is a plan view of the detecting device before application to the cow and drawn to a reduced scale.

FIG. 3 is a longitudinal sectional view taken on line 3—3 of FIG. 2 and drawn to a greater scale than FIG. 2.

FIG. 4 is a cross sectional view taken on line 4—4 of FIG. 2 and drawn to an enlarged scale.

FIG. 5 is a perspective view of the container section of the partitioning means of the invention removed from the container.

FIG. 6 is a perspective view of the receptacle section of the partitioning means.

FIG. 7 is a perspective view of the bubble of the invention detached from the base.

FIG. 8 is an elevational sectional view similar to FIG. 3 showing a modified form of container and receptacle.

FIG. 9 is a perspective view of a modified form of the partitioning means.

FIG. 10 is an elevational sectional view similar to FIG. 3 and showing a container, receptacle and modified form of partitioning means.

FIG. 11 is a perspective view of the partitioning means shown in FIG. 10 and removed from the container.

FIG. 12 is another perspective view of the partitioning means shown in FIG. 11 and taken from a different point of view.

For the purpose of illustrating the application of the invention, a portion of a cow 10 has been shown in the drawing which illustrates the back 11 of the cow and the backbone 12 runing along the same. In addition, the hip bones of the trunk of the cow have been shown which are indicated by the reference numeral 13.

The invention comprises a base or supporting structure 20 on which is mounted a bubble 80. A flexible container 30 and a transparent receptacle 40 connected together by means of a cemented or welded seam 39′ constitutes a unit 70 which is deposed in the bubble 80 and held in position on the base 20 thereby.

The base 20 is constructed from a sheet of canvas or similar fabric material and which is adapted to conform to the surface of the cow's back on which the same is applied.

The bubble 80 is constructed with an inverted U-shaped body 81 which includes a longitudinal wall structure 82 open at the bottom. The ends of this wall structure are closed by means of end walls 83 and 84. A planiform flange 85 extends about the wall structure 82 and the end walls 83 and 84 issues outwardly from the lower edges of said wall structure and walls. The bubble 80 is disposed upon the upper surface 21 of the base 20 and when so disposed provides a pocket 86 of dimensions to snuggly receive the unit 70. Flange 85 may be cemented to the base 20 or secured thereto by means of stitches 87. These stitches fall short of the end wall 83 to permit of folding said end wall and a portion of the wall structure away from the base 20 for insertion of the unit 70 into the pocket 86 of the bubble. Bubble 80 is constructed of a material which is transparent and extremely flexible.

The container 30 best shown in FIG. 3 is tubular in form having a body 31 constructed with a tubular wall 32 closed at one end by means of a wall 33 and open at the other end. This construction further includes an end portion 34 which serves as a neck for the container and which has a bore 38 in the same. The bore 38 is of the same diameter as the bore 35 of walls 32. Between the neck 34 and the body 31 is an annular inwardly extending bead 39 serving as a shoulder to hold the section of the partitioning means within the neck 34.

The container 30 is constructed of polyethylene and preferably colored white so as to be perfectly opaque. The type of polyethylene employed within the same is highly flexible and also will expand in a radial direction when pressure is applied to said container.

The receptacle 40 is constructed similar to the container 30 and is of the same diameter and construction. The receptacle 40 has a body 41 formed with a tubular wall 42, an end wall 43 and a neck 44. At the juncture between the neck 44 and the body 41 is provided an inwardly extending bead 49. The receptacle 40, however, is constructed of clear polyethylene so as to readily display the liquid contained within the same.

Disposed in the neck 34 of container 30 is one section 57 of partitioning means 50 shown in detail in FIG. 5 which may also be constructed of a plastic material and which is cylindrical in form and fits snuggly within the bore 38 of said neck. The section 57 of partitioning means 50 is held from inward movement into the bore 35 of wall 32 by means of the bead 39. The said section is constructed with ends 51 and 52 and an outer portion 53 which engages the bore 38 of neck 34. The outer portion 53 is provided with grooves 54 which extend through the outer surface 55 of said partitioning means and through the inner end 52 of the same which lies adjacent receptacle 40. These grooves fall short of the other end 51 leaving lands 56 between the end 51 of said section and the ends of said grooves. These lands serve as valve seats. The bore 38 of the neck 34 has lands 37 which overlie the lands 56 and which serve as valve members. The valve members 37 and the valve seats 56 provide valves which serve to bring the container into communication with the receptacle. When external pressure is applied to the container 30, the neck 34 expands and the valve members 37 leave valve seats 56 to permit the flow of fluid from the container 30 to the receptacle 40 and vice versa.

The other section 58 of the partitioning means 50 is shown in detail in FIG. 6 and is cylindrical in form, fitting snuggly in the bore 48 in neck 44. This section is formed with a groove 59 providing a passageway therethrough and located at the upper portion thereof. The section 58 is forced toward the shoulder 49 of receptacle 40 and so maintained by pressure created in container 30 thus providing a compartment 91 therebetween freely communicating with the bore 45 of receptacle 40 and normally out of communication with the bore 35 of container 30.

Disposed within the container 30 is a liquid 60 which is colored and preferably colored red. This liquid may contain alcohol to prevent the same from freezing or any other readily-flowing liquid may be employed. This liquid only partly fills the container 30.

The unit 70 is formed in the following manner: The container 30 is first arranged in a vertical position with the neck 34 uppermost. The liquid 60 is then poured into the body 31 of the container through the open end thereof. Only so much liquid is used as will bring the level of the same somewhat below the shoulder 39. The section 57 of the partitioning means 50 is urged inwardly until it reaches shoulder 39. The receptacle 40 is next inverted and the section 58 of the partitioning means 50 inserted into the bore 48 of receptacle 40 until the same reaches the shoulder 49 of said receptacle. The receptacle 40 is next inverted and placed with the end of neck 44 resting upon the end of neck 34. With the parts so positioned the contacting portions are welded together to form the seam 39′ and which makes an air-tight connection between the receptacle and container. In the welding of the two parts of the unit together seam 39′ extends inwardly into the necks 34 and 44 and serves as a shoulder which restrains outward movement of the section 51 of partitioning means 50 relative to container 30.

The manner of using the invention is as follows: Unit 70 is first held in a vertical position with the container 30 lowermost. Upon the squeezing wall 32 of the container the valve comprising the seats 56 and valve members 37 open to permit of expelling the air which is in the said container and directing it into the compartment 91 and from which it flows freely through passageway 59 and into the bore 45 of receptacle 40. Upon releasing said wall the wall reverts to its normal position and withdraws any liquid which may be contained within the receptacle 40. After such liquid has been returned to said container, air is drawn from the receptacle 40 until equilibrium has been reached. The valve then becomes closed and the fluid is trapped in the container 30. The unit 70 is next inserted into the pocket 86 of bubble 80 by lifting the unattached end thereof and directing the unit into said bubble through this end of the bubble. End wall 84 terminates forward movement of the unit. Base 20 is then applied to the cow's back as shown in FIG. 1 by cementing the same in position. The base 20 is provided with marks 22 which indicate where the device is to be placed with reference to the hip bones 13 of the cow. These marks are for the purpose of properly applying the device to operate in conjunction with small, medium and large size cows. The base 20 is so arranged that the end wall 84 of the bubble 80 is at the forward portion of the device.

When another cow mounts the cow in heat such cow's breastbone is caused to rest upon the bubble 80 at the locality of the container 30 and creates a pressure in the same which causes a portion of the fluid in container 30 to flow into compartment 91 through grooves 54 in section 57 of partitioning means 50 and from there through passageway 59 in section 58 of said partitioning means and into receptacle 40. Any forward movement occasioned by the mounting cow is restrained by the end wall 84 of the bubble 80. As soon as the pressure in both the receptacle and container equalizes, the flow discontinues. Upon the cow dismounting, the container 30 resumes its normal cylindrical shape and the pressure on container 30 is released and the pressure in receptacle 40 becomes higher than in container 30. Principally air flows back into container 30 until the pressure in the container and receptacle are again equalized. The liquid discharged into receptacle 40 remains in said receptacle due to the fact that the only outlet therefor back to the container 30 is through the passageway 59 in the section 58 and which is at the top of the unit. Since the container 30 is only partly filled with liquid, the liquid discharged into receptacle 40 does not reach up to the level of said passageway and only air is returned to the container. The receptacle 40 being transparent, the liquid contained therein is visible through the wall thereof and indicates that the cow has been mounted and is in heat.

The weight of the mounting cow being considerable and due to the fact that the cow has to raise her front legs in performing the act, a great percentage of her weight aided by gravity causes the pressure of the cow's breastbone upon the container 30 to result in almost instantaneous transfer of the liquid from the container 30 to the receptacle 40.

It frequently occurs that the mounting cow attempts to mount a cow who is not in heat. In such case the cow not in heat walks away and the fore part of the mounting cow drops to the ground without having succeeded in performing the act. Sometimes the head of the mounting cow strikes the container 30 a slight blow causing a small amount of liquid to discharge which is collected in the compartment 91. This liquid due to the outlet 59 being at the top of the unit 70 never reaches the bore of the receptacle 40 and no indication is given. The same may happen when the cow being tested passes under a low branch of a tree or a rail of a fence.

When a cow has been mounted by another cow and the device operated and has been separated from the herd, the unit 70 is removed from the bubble 80 placed in a vertical position with the container 30 lowermost. The liquid in both the container 30 and receptacle 40 will be lowermost and the air uppermost. Successive squeezing and releasing of the container 30 will force the air in said container into receptacle 40 and draw all of the liquid in receptacle 40 down into container 30. In this manner the device becomes reset and the unit 70 can be replaced in bubble 80 and the device is ready for repeated use. Thus, the base 20 can be left on the cow's back and the device used repeatedly in the event the cow does not conceive.

In FIG. 8 a modification of the invention has been shown. This form of the invention being quite similar to the form previously described will not be again described in detail and the same reference numerals will be used to designate corresponding parts, said reference numerals being preceded by the digit 1. In the form of the invention shown in FIG. 8, the bodies 131 and 141 are made smaller in diameter than the necks 134 and 144. This construction provides shoulders 139 and 149 therebetween which serve the same purpose as the shoulders 39 and 49 of the other form of the invention.

In FIG. 9 is shown a modification of the partitioning means. The construction shown in this figure is similar to that shown in FIGS. 5 and 6 except that the parts are connected together. The same reference numerals preceded by the reference numeral 2 will be used to designate corresponding parts. In this form of the invention the sections 257 and 258 are secured together in relation to one another to provide the compartment 291 by means of connector 293 of smaller diameter than the diameters of said sections and preferably formed integral therewith. The operation of this form of the invention is the same as the form of the invention shown in FIGS. 5 and 6.

In FIGS. 10, 11 and 12 has been shown a construction in which operation of the device is accidentally prevented by using a lesser amount of liquid in the unit than employed with the other forms of the invention and arranging the passageways leading from the container to the receptacle at the upper portion of the partitioning means and using an amount of liquid which when disposed in the container is below the lowermost part of the passageways. Again the same reference numerals as used in describing the first form of the invention will be used to designate corresponding parts and said reference numerals will be preceded by the reference numeral 3. The construction employed consists of a single partitioning member 357 of a length to be received in the bore 338 of neck 334 and of the same diameter as the section 57 of partitioning means 50. At the upper portion of the same is formed two longitudinally extending grooves 354 which fall short of the innermost end 351 of the member 357 to provide lands 356 between the ends of said grooves and the end 351 of the member. These lands serve as valve seats the same as in the other form of the invention. The other ends of said grooves are connected together by means of an arcuate groove 394 which is disposed intermediate the ends 351 and 352 of the member 357. This groove is in turn connected to the bore 348 of the neck 344 of receptacle 340 by means of a longitudinal groove 359 which extends through the end wall 352 of said member.

The operation of this device is similar to that previously described excepting that the liquid in the container is normally below the level of the grooves 354. Accidental engagement of the container as previously described will hence only exhaust the air in the container before any of the liquid enters the receptacle. The compartment 91 is hence dispensed with.

The advantages of the invention are manifest. By the use of the canvas base the device can be made to conform to the irregular contour of the cow's back and be more firmly attached thereto. By the use of a bubble the unit is protected and rigidly held in position. The bubble employed offers some resistance to collapsing of the container and thus assists in preventing accidental operation of the device, which together with the compartment 91 in the first described form of the invention, the similar compartment 191 in the second described form of the invention and the specific construction of the partitioning member in the third described form of the invention prevents giving a false indication. The receptacle and container being permanently sealed together, leakage of the fluid from the invention is prevented and the unit is always ready for immediate use. The device is economical to manufacture and can be built at a nominal expense. The device can be used over and over and is not readily broken or rendered inoperative.

Changes in the specific form of the invention, as herein described, may be made within the scope of what is claimed without departing from the spirit of the invention.

Having described the invention, what is claimed as new and described to be protected by Letters Patent is:

1. In a cattle standing heat detecting device,
 (a) a base for attachment to the back of the cow to be bred,
 (b) a container mounted on said base on a substantially horizontal axis and constructed from resilient material and having a tubular wall,
 (c) a colored liquid within said container of a depth not exceeding said axis,
 (d) a transparent receptacle for the reception of the colored liquid and mounted on said base ahead of said container,
(e) means for connecting said container to said receptacle for communication therebetween,
(f) partitioning means between said container and receptacle,
(q) said partitioning means having a portion adjacent the end thereof next to the liquid in said container and serving as a valve seat,
(i) said wall being expansible and having a portion adjacent said valve seat and engageable therewith, said portion serving as a valve member,
(r) passageways in said partitioning means leading from said valve seats,
(s) said passageways communicating with a discharge passageway extending through the end of said partitioning means opposite said valve seat,
(t) said discharge passageway being disposed at the upper portion of said partitioning means above said horizontal axis and discharging into the upper portion of said receiver.

2. In a cattle standing heat detecting device,
(a) a base for attachment to the back of the cow to be bred,
(b) a container mounted on said base and constructed from resilient material and having a tubular wall,
(c) a colored liquid within said container,
(d) a transparent receptacle for the reception of the colored liquid and mounted on said base ahead of said container,
(e) means for connecting said container to said receptacle for communication therebetween,
(f) partitioning means between said container and receptacle,
(u) said partitioning means having two portions adjacent the end thereof next to the liquid and at an elevation above the liquid and serving as valve seats,
(v) longitudinal grooves in said partitioning means leading from said valve seats and terminating short of the other end of the partitioning means,
(w) a circumferential groove connecting said longitudinal grooves together and
(x) a longitudinal discharge passageway communicating with said circumferential passageway and extending through the opposite wall of said partitioning means and discharging into said receiver at the uppermost portion thereof.

3. In a cattle standing heat detecting device,
(a) a base for attachment to the back of the cow to be bred,
(b) a container mounted on said base and constructed from resilient material and having a tubular wall,
(c) a colored liquid within said container,
(d) a transparent receptacle for the reception of the colored liquid and mounted on said base ahead of said container,
(e) means for connecting said container to said receptacle for communication therebetween,
(aa) partitioning means between said container and receptacle including a container section and a receptacle section separated from one another to form a compartment therebetween,
(bb) said container section having a number of spaced portions adjacent the liquid serving as valve seats,
(o) said wall being expansible and having portions adjacent said valve seats and engageable therewith, said portions serving as valve members, and
(cc) a plurality of longitudinal grooves in the outer portion of said container section leading from said valve seats and discharging into said compartment, and
(dd) a single groove in said receptacle section conducting fluid from said compartment to the upper portion of said receptacle.

4. In a cattle standing heat detecting device,
(a) a base for attachment to the back of the cow to be bred,
(b) a container mounted on said base and constructed from resilient material and having a tubular wall,
(c) a colored liquid within said container,
(d) a transparent receptacle for the reception of the colored liquid and mounted on said base ahead of said container,
(e) means for connecting said container to said receptacle for communication therebetween,
(aa) partitioning means between said container and receptacle including a container section and a receptacle section separated from one another to form a compartment therebetween,
(bb) said container section having a number of spaced portions adjacent the liquid serving as valve seats,
(o) said wall being expansible and having portions adjacent said valve seats and engageable therewith, said portions serving as valve members,
(ee) means for conducting fluid from said valve seat and into said compartment and
(ff) means for conducting fluid from said compartment and into said receptacle at the upper portion thereof.

5. In a cattle standing heat detecting device,
(a) a base for attachment to the back of the cow to be bred,
(b) a container mounted on said base and constructed from resilient material and having a tubular wall,
(c) a colored liquid within said container,
(d) a transparent receptacle for the reception of the colored liquid mounted on said base ahead of said container,
(e) means for connecting said container to said receptacle for communication therebetween,
(aa) partitioning means between said container and receptacle including a container section and a receptacle section separated from one another to form a compartment therebetween,
(bb) said container section having a number of spaced portions adjacent the liquid serving as valve seats,
(o) said wall being expansible and having portions adjacent said valve seats and engageable therewith, said portions serving as valve members, and
(ee) means for conducting fluid from said valve seat and into said compartment,
(ff) means for conducting fluid from said compartment and into said receptacle at the upper portion thereof, and
(gg) a connector connecting said sections together.

6. In a cattle standing heat detecting device,
(a) a base for attachment to the back of the cow to be bred,
(b) a container mounted on said base and constructed from resilient material and having a tubular wall,
(c) a colored liquid within said container,
(d) a transparent receptacle for the reception of the colored liquid and mounted on said base ahead of said container,
(e) means for connecting said container to said receptacle for communication therebetween,
(aa) partitioning means between said container and receptacle including a container section and a receptacle section separated from one another to form a compartment therebetween,
(bb) said container section having a number of spaced portions adjacent the liquid serving as valve seats,
(o) said wall being expansible and having portions adjacent said valve seats and engageable therewith, said portions serving as valve members, and
- (ee) means for conducting fluid from said valve seat and into said compartment,
- (ff) means for conducting fluid from said compartment and into said receptacle at the upper portion thereof, and
- (gg) a connector connecting said sections together,
- (hh) said sections and connector being integral.

References Cited by the Examiner

UNITED STATES PATENTS

| | | | |
|---|---|---|---|
| 3,076,431 | 2/63 | Rule et al. | 119—1 |
| 3,158,134 | 11/64 | Larson | 119—1 |

SAMUEL KOREN, *Primary Examiner.*

ALDRICH F. MEDBERY, *Examiner.*